US012618955B1

(12) United States Patent
Mo et al.

(10) Patent No.: US 12,618,955 B1
(45) Date of Patent: May 5, 2026

(54) ADAPTIVE RETROSPECTIVE TRANSMIT BEAMFORMING (RTB) FOR A LOWPOWER HANDHELD ULTRASOUND SCANNER

(71) Applicant: yoR Labs, Inc., Portland, OR (US)

(72) Inventors: Larry Y. L. Mo, Latham, NY (US);
Anshumali Roy, Portland, OR (US);
Clark D. Brooks, Hillsboro, OR (US)

(73) Assignee: yoR Labs, Inc., Portland, OR (US)

( * ) Notice: Subject to any disclaimer, the term of this patent is extended or adjusted under 35 U.S.C. 154(b) by 358 days.

(21) Appl. No.: 17/453,452

(22) Filed: Nov. 3, 2021

Related U.S. Application Data

(60) Provisional application No. 63/110,028, filed on Nov. 5, 2020.

(51) Int. Cl.
*G01S 7/52* (2006.01)
*G01S 15/89* (2006.01)

(52) U.S. Cl.
CPC ...... *G01S 7/52095* (2013.01); *G01S 15/8915* (2013.01)

(58) Field of Classification Search
None
See application file for complete search history.

(56) References Cited

U.S. PATENT DOCUMENTS

| | | | |
|---|---|---|---|
| 4,998,132 | A | 3/1991 | Kurogane |
| 5,364,351 | A | 11/1994 | Heinzelman et al. |
| 5,617,371 | A | 4/1997 | Williams |
| 5,903,516 | A | 5/1999 | Greenleaf et al. |

(Continued)

FOREIGN PATENT DOCUMENTS

| | | |
|---|---|---|
| AU | 2018250516 | 11/2018 |
| CN | 109886944 | 6/2019 |

(Continued)

OTHER PUBLICATIONS

Lin et al., Jun. 2010, A motion compounding technique for speckle reduction in ultrasound images, Journal of digital imaging 23(3):246-257.

(Continued)

*Primary Examiner* — Christopher Koharski
*Assistant Examiner* — Renee C Langhals
(74) *Attorney, Agent, or Firm* — Knobbe, Martens, Olson & Bear, LLP

(57) ABSTRACT

Systems and methods of adaptive retrospective transmit beamforming (RTB) on handheld ultrasound imaging device. A system can include an ultrasound imaging array having a plurality of transducers configured to transmit and receive ultrasound waves, and an adaptive retrospective transmit beamforming controller for controlling the processing of received ultrasound waves based on at least one input. A method of generating an ultrasound image with a handheld ultrasound imaging device can include transmitting a plurality of ultrasound waves into a medium, receiving ultrasound waves propagating through the medium that are generated by the plurality of ultrasound waves transmitted into the medium, receiving at least one input, and processing of the received ultrasound waves by adaptively performing retrospective transmit beamforming in the handheld ultrasound imaging device based on the at least one input.

19 Claims, 7 Drawing Sheets

(56)  References Cited

U.S. PATENT DOCUMENTS

| | | | |
|---|---|---|---|
| 5,908,389 | A | 6/1999 | Roundhill et al. |
| 6,031,529 | A | 2/2000 | Migos |
| 6,063,030 | A | 5/2000 | Vara et al. |
| 6,120,450 | A | 9/2000 | Li |
| 6,123,670 | A | 9/2000 | Mo |
| 6,132,374 | A | 10/2000 | Hossack et al. |
| 6,245,017 | B1 | 6/2001 | Hashimoto |
| 6,400,981 | B1 | 6/2002 | Govari |
| 6,607,489 | B2 | 8/2003 | Hoctor |
| 6,689,062 | B1 | 2/2004 | Mesallum |
| 6,690,963 | B2 | 2/2004 | Haim et al. |
| 6,908,434 | B1 | 6/2005 | Jenkins et al. |
| 7,090,639 | B2 | 8/2006 | Govari |
| 7,423,578 | B1 | 9/2008 | Tietjen |
| 7,604,601 | B2 | 10/2009 | Altmann et al. |
| 7,648,462 | B2 | 1/2010 | Jenkins et al. |
| 7,667,639 | B2 | 2/2010 | Cheng et al. |
| 7,682,358 | B2 | 3/2010 | Gullickson et al. |
| 7,750,849 | B2 | 7/2010 | Hjelmstad |
| 7,831,076 | B2 | 11/2010 | Altmann et al. |
| 7,860,553 | B2 | 12/2010 | Govari et al. |
| 7,918,793 | B2 | 4/2011 | Altmann et al. |
| 7,996,060 | B2 | 8/2011 | Trofimov et al. |
| 8,075,486 | B2 | 12/2011 | Tal |
| 8,285,364 | B2 | 10/2012 | Barbagli et al. |
| 8,390,438 | B2 | 3/2013 | Olson et al. |
| 8,449,467 | B2 | 5/2013 | Wilser et al. |
| 8,517,946 | B2 | 8/2013 | Kim |
| 8,676,290 | B2 | 3/2014 | Tegg |
| 8,690,871 | B2 | 4/2014 | Partlett et al. |
| 8,702,612 | B2 | 4/2014 | Hendriks et al. |
| 8,989,842 | B2 | 3/2015 | Li et al. |
| 9,030,354 | B2 | 5/2015 | Natarajan |
| 9,055,883 | B2 | 6/2015 | Tgavalekos et al. |
| 9,095,682 | B2 | 8/2015 | Romoscanu |
| 9,132,913 | B1 | 9/2015 | Shapiro et al. |
| 9,179,890 | B2 | 11/2015 | Ionasec et al. |
| 9,211,160 | B2 | 12/2015 | Pivotto et al. |
| 9,261,595 | B2 | 2/2016 | Garbini et al. |
| 9,323,445 | B2 | 4/2016 | Kritt et al. |
| 9,342,156 | B2 | 5/2016 | Huh |
| 9,922,554 | B2 | 3/2018 | Mikuni et al. |
| 9,931,487 | B2 | 4/2018 | Quinn et al. |
| 9,986,969 | B2 | 6/2018 | Call et al. |
| 10,183,149 | B2 | 1/2019 | Tegg et al. |
| 10,206,652 | B2 | 2/2019 | Deno et al. |
| 10,368,951 | B2 | 8/2019 | Moll et al. |
| 10,401,492 | B2 | 9/2019 | Brooks |
| 10,405,830 | B2 | 9/2019 | Garbini et al. |
| 10,463,439 | B2 | 11/2019 | Joseph et al. |
| 10,499,882 | B2 | 12/2019 | Hunter et al. |
| 10,537,307 | B2 | 1/2020 | Yang |
| 10,555,780 | B2 | 2/2020 | Tanner et al. |
| 10,624,612 | B2 | 4/2020 | Sumi |
| 11,344,281 | B2 | 5/2022 | Morisse et al. |
| 11,547,386 | B1 | 1/2023 | Roy et al. |
| 11,892,542 | B1 | 2/2024 | Brooks |
| 11,998,391 | B1 | 6/2024 | Roy et al. |
| 12,156,761 | B1 | 12/2024 | Roy |
| 2002/0173721 | A1 | 11/2002 | Grunwald |
| 2002/0173722 | A1 | 11/2002 | Hoctor et al. |
| 2003/0007598 | A1 | 1/2003 | Wang et al. |
| 2003/0055334 | A1 | 3/2003 | Steinbacher et al. |
| 2003/0055337 | A1 | 3/2003 | Lin |
| 2004/0102700 | A1 | 5/2004 | Asafusa |
| 2004/0267124 | A1 | 12/2004 | Roundhill |
| 2005/0288588 | A1 | 12/2005 | Weber et al. |
| 2006/0173663 | A1 | 8/2006 | Langheier |
| 2007/0027733 | A1 | 2/2007 | Balle |
| 2007/0038088 | A1* | 2/2007 | Rich ........................ A61B 8/00 |
| | | | 600/437 |
| 2007/0174772 | A1 | 7/2007 | Gorman |
| 2007/0200760 | A1 | 8/2007 | Hjelmstad |
| 2007/0239001 | A1 | 10/2007 | Mehi et al. |
| 2007/0259158 | A1 | 11/2007 | Friedman et al. |
| 2008/0012753 | A1 | 1/2008 | Cheng |
| 2008/0021324 | A1 | 1/2008 | Seto |
| 2008/0114239 | A1* | 5/2008 | Randall ................. G01S 7/5208 |
| | | | 600/437 |
| 2008/0146940 | A1 | 6/2008 | Jenkins et al. |
| 2008/0215046 | A1 | 9/2008 | Messing et al. |
| 2008/0306385 | A1 | 12/2008 | Jago |
| 2009/0043206 | A1 | 2/2009 | Towfiq et al. |
| 2009/0118620 | A1 | 5/2009 | Tgavalekos et al. |
| 2009/0171275 | A1 | 7/2009 | Ostrovsky et al. |
| 2009/0250729 | A1* | 10/2009 | Lemmerhirt ............ A61B 8/00 |
| | | | 257/254 |
| 2009/0271704 | A1 | 10/2009 | Cohen |
| 2010/0030076 | A1 | 2/2010 | Vortman et al. |
| 2010/0081938 | A1 | 4/2010 | Kato |
| 2010/0146431 | A1 | 6/2010 | Raji et al. |
| 2010/0160784 | A1* | 6/2010 | Poland ................. A61B 8/4444 |
| | | | 600/459 |
| 2010/0168580 | A1 | 7/2010 | Thiele |
| 2010/0234831 | A1 | 9/2010 | Hinman et al. |
| 2010/0251823 | A1 | 10/2010 | Adachi |
| 2011/0077524 | A1 | 3/2011 | Oshiki et al. |
| 2011/0137132 | A1 | 6/2011 | Gustafson |
| 2011/0208052 | A1 | 8/2011 | Entrekin |
| 2011/0225114 | A1 | 9/2011 | Gotthardt |
| 2012/0059249 | A1 | 3/2012 | Verard et al. |
| 2012/0075208 | A1 | 3/2012 | Tamiya et al. |
| 2012/0157851 | A1 | 6/2012 | Zwirn |
| 2012/0254747 | A1 | 10/2012 | Bocirnea |
| 2013/0015975 | A1 | 1/2013 | Huennekens et al. |
| 2013/0035596 | A1 | 2/2013 | Lonasec |
| 2013/0120296 | A1 | 5/2013 | Merritt et al. |
| 2013/0227052 | A1 | 8/2013 | Wenzel |
| 2013/0234891 | A1 | 9/2013 | Natarajan et al. |
| 2013/0238990 | A1 | 9/2013 | Ubillos et al. |
| 2013/0241355 | A1 | 9/2013 | Okada et al. |
| 2013/0253317 | A1 | 9/2013 | Gauthier |
| 2013/0274712 | A1 | 10/2013 | Schecter et al. |
| 2013/0310690 | A1 | 11/2013 | Chang |
| 2014/0035916 | A1 | 2/2014 | Murphy |
| 2014/0046188 | A1 | 2/2014 | Yen et al. |
| 2014/0058266 | A1 | 2/2014 | Call et al. |
| 2014/0059486 | A1 | 2/2014 | Sasaki et al. |
| 2014/0087342 | A1 | 3/2014 | Campanatti, Jr. |
| 2014/0164965 | A1 | 6/2014 | Lee et al. |
| 2014/0189560 | A1 | 7/2014 | Caspi |
| 2014/0219059 | A1 | 8/2014 | Younghouse |
| 2014/0336573 | A1 | 11/2014 | Yu et al. |
| 2015/0019488 | A1 | 1/2015 | Higginson et al. |
| 2015/0049578 | A1 | 2/2015 | Hoctor et al. |
| 2015/0065877 | A1 | 3/2015 | Orderud |
| 2015/0082251 | A1 | 3/2015 | Lam |
| 2015/0272547 | A1* | 10/2015 | Freiburger ............... A61B 8/52 |
| | | | 600/438 |
| 2015/0293223 | A1 | 10/2015 | Park et al. |
| 2016/0016015 | A1 | 1/2016 | Slayton |
| 2016/0054901 | A1 | 2/2016 | Yang et al. |
| 2016/0095650 | A1 | 4/2016 | Greifenender et al. |
| 2016/0157824 | A1 | 6/2016 | Park et al. |
| 2016/0161589 | A1 | 6/2016 | Benattar |
| 2016/0161594 | A1 | 6/2016 | Benattar |
| 2016/0161595 | A1 | 6/2016 | Benattar |
| 2016/0165358 | A1 | 6/2016 | Benattar |
| 2016/0165341 | A1 | 6/2016 | Benattar |
| 2016/0338676 | A1 | 11/2016 | Berger et al. |
| 2017/0072167 | A1 | 3/2017 | Weitzner et al. |
| 2017/0090571 | A1 | 3/2017 | Bjaerum |
| 2017/0153801 | A1 | 6/2017 | Kim et al. |
| 2017/0156698 | A1 | 6/2017 | Park et al. |
| 2017/0266413 | A1 | 9/2017 | Khuu et al. |
| 2017/0307755 | A1 | 10/2017 | Brooks |
| 2017/0326337 | A1 | 11/2017 | Romoscanu et al. |
| 2017/0343655 | A1 | 11/2017 | Solek et al. |
| 2017/0343668 | A1 | 11/2017 | Brooks et al. |
| 2018/0000449 | A1 | 1/2018 | Moore et al. |
| 2018/0000453 | A1 | 1/2018 | Hunter et al. |
| 2018/0003811 | A1* | 1/2018 | Pellegretti ................ A61B 8/54 |
| 2018/0055483 | A1 | 3/2018 | Hunter |
| 2018/0064415 | A1 | 3/2018 | Zhai et al. |

(56) References Cited

U.S. PATENT DOCUMENTS

| | | |
|---|---|---|
| 2018/0361145 A1 | 12/2018 | Mahapatra et al. |
| 2019/0022699 A1 | 1/2019 | Beers et al. |
| 2019/0201110 A1 | 7/2019 | Kuenen |
| 2019/0245310 A1 | 8/2019 | Medina et al. |
| 2019/0261953 A1 | 8/2019 | Honjo et al. |
| 2019/0307427 A1 | 10/2019 | Levy et al. |
| 2019/0324139 A1 | 10/2019 | Brooks |
| 2019/0353975 A1 | 11/2019 | DiDomenico |
| 2020/0000430 A1* | 1/2020 | Chamberlain ........... A61B 8/54 |
| 2020/0046321 A1 | 2/2020 | Duda |
| 2020/0060646 A1 | 2/2020 | Lindenroth et al. |
| 2020/0170662 A1 | 6/2020 | Vardi |
| 2020/0178928 A1 | 6/2020 | Park et al. |
| 2020/0183004 A1 | 6/2020 | Gong et al. |
| 2020/0205783 A1 | 7/2020 | Shiran |
| 2020/0268351 A1 | 8/2020 | Chiang |
| 2020/0281565 A1 | 9/2020 | Yee et al. |
| 2020/0297318 A1 | 9/2020 | Srinivasa et al. |
| 2020/0315592 A1 | 10/2020 | Soleimani et al. |
| 2020/0330076 A1* | 10/2020 | Weber ................. G01S 7/52033 |
| 2020/0375576 A1* | 12/2020 | Moulton ............. A61B 8/0891 |
| 2021/0007710 A1 | 1/2021 | Douglas |
| 2021/0022716 A1 | 1/2021 | Kerby |
| 2021/0030394 A1 | 2/2021 | Caswell et al. |
| 2021/0038334 A1 | 2/2021 | Hsu et al. |
| 2021/0125503 A1 | 4/2021 | Henry et al. |
| 2021/0174496 A1 | 6/2021 | Annangi et al. |
| 2021/0177379 A1 | 6/2021 | Kolen et al. |
| 2021/0196237 A1 | 7/2021 | Bellamkonda |
| 2021/0321989 A1 | 10/2021 | McLaughlin |
| 2021/0338208 A1 | 11/2021 | Nguyen et al. |
| 2021/0401400 A1 | 12/2021 | Sheehan et al. |
| 2021/0401508 A1 | 12/2021 | Zhao |
| 2022/0061811 A1 | 3/2022 | Terleski |
| 2022/0061814 A1 | 3/2022 | Morrise |
| 2022/0061906 A1 | 3/2022 | Gommeren et al. |
| 2022/0151591 A1 | 5/2022 | Morrise |
| 2022/0156094 A1 | 5/2022 | Morrise |
| 2022/0167947 A1 | 6/2022 | Seth |
| 2022/0401081 A1 | 12/2022 | Sheeran et al. |
| 2023/0026942 A1 | 1/2023 | Meral |
| 2023/0059122 A1 | 2/2023 | Pellegrino |
| 2024/0013430 A1 | 1/2024 | Wang et al. |
| 2024/0324996 A1 | 10/2024 | Pellegrino |
| 2024/0389980 A1 | 11/2024 | Roy |

FOREIGN PATENT DOCUMENTS

| | | | |
|---|---|---|---|
| EP | 2 818 115 | 12/2014 | |
| EP | 2 842 497 | 3/2015 | |
| EP | 2 288 284 | 5/2016 | |
| EP | 3 275 478 | 1/2018 | |
| EP | 2 707 076 | 11/2018 | |
| EP | 3 050 214 | 3/2019 | |
| EP | 3 371 624 | 6/2019 | |
| EP | 2 632 318 | 11/2019 | |
| EP | 3 518 777 | 3/2021 | |
| WO | WO 02/13682 | 2/2002 | |
| WO | WO 04/082453 | 9/2004 | |
| WO | WO-2009079695 A1 * | 7/2009 | ............... A61B 8/00 |
| WO | WO 10/051587 | 5/2010 | |
| WO | WO 12/088535 | 6/2012 | |
| WO | WO 17/185097 | 10/2017 | |
| WO | WO 20/049012 | 3/2020 | |
| WO | WO 20/252416 | 12/2020 | |
| WO | WO 22/170807 | 8/2022 | |

OTHER PUBLICATIONS

Bradley, "Retrospective Transmit Beamformation", Whitepaper Acuson SC2000™ Volume Imaging Ultrasounds System, Aug. 2008.

Pandian et al., Jun. 18, 1992, Intravascular ultrasound and intracardiac echocardiography: concepts for the future, American Journal of Cardiology, 69(20):H6-H17.

Zarkos et al., Jun. 2, 2023, Fully integrated electronic-photonic ultrasound receiver array for endoscopic applications in a zero-change 45-nm CMOS-SOI process, IEEE Journal of Solid State Circuits, 58(6):1718-1734.

Zhang et al., Oct. 19, 2021, Integrated circuits for medical ultrasound applications: imaging and beyond, IEEE Transactions on Biomedical Circuits and Systems, 15(5):838-858.

Clevert et al., 2007, Value of tissue harmonic imaging (THI) and contrast harmonic imaging (CHI) in detection and characterisation of breast tumours, Eur Radiol, 17:1-10.

* cited by examiner

ADAPTIVE RETROSPECTIVE TRANSMIT BEAMFORMING (RTB) FOR A LOWPOWER HANDHELD ULTRASOUND SCANNER

REFERENCE TO PRIORITY APPLICATIONS

Any and all applications for which a foreign or domestic priority claim is identified in the Application Data Sheet as filed with the present application are hereby incorporated by reference under 37 CFR 1.57.

TECHNICAL FIELD

This disclosure relates to ultrasound imaging using a handheld ultrasound scanner. In particular, this disclosure relates to changing retrospective transmit beamforming (RTB) in the handheld ultrasound scanner based on inputs or sensed characteristics.

BACKGROUND

Software-driven ultrasound imaging has given rise to an advanced beamforming method known as retrospective transmit beamforming (RTB). RTB is a transmit focusing technology that achieves dynamic focusing by performing the transmit focusing operation retrospectively, and thus may achieve acceptable image quality at real-time volume rates. Two issues make two-dimensional (2D) ultrasound acquisition challenging for supporting real-time volumetric imaging. First, the 2D methodology is serial, and line-by-line acquisition is too slow for use with volumetric imaging. Traditionally a 2D ultrasound image is composed of a set of lines. The imaging device acquires image data along each of the lines, one after another, until a full frame has been scanned. A corresponding volumetric image may be composed of 10,000 lines, so the time to scan a full volume would be 100 times greater than the time necessary to scan a single 2D frame having 100 lines.

Second, 2D image acquisition models relate to the type of focusing that is used during a transmit cycle. There are two very different forms of focusing that are used in ultrasound imaging: static and dynamic. Static focusing is used during a transmit cycle. Dynamic focusing is used during a receive cycle. The problem lies in the use of static focusing during the transmit cycle. Where static transmit focusing yields sufficient image quality in the low acquisition rate, line-by-line 2D paradigm, it does not yield adequate image quality in the high acquisition rate, subvolume-by-subvolume volumetric paradigm. In order to rectify this image quality issue, transmit focusing can be made dynamic. The RTB imaging methodology is focusing technology that enables dynamic transmit focusing at the very high acquisition rates necessary for real-time, or near real-time, volumetric imaging. To provide additional advantages to RTB imaging methodology, it would be advantageous to control the RTB process based on one or more factors.

SUMMARY

Systems and methods of ultrasound imaging can use retrospective transmit beamforming that is dynamically controlled by an input from a user or a sensor/device. For example, an RTB controller may be configured to include RTB control functionality that is based on one or more of the system state, probe motion, the user control, anatomy of (e.g., of what is being imaged, and/or an amount of three-dimensional (3D) rendering that is being used. In an embodiment, the system state may include a temperature of the body of the imaging device or another portion of the imaging device. In an embodiment, the system state may include the remaining battery life left, e.g., in a wireless ultrasound device. In an embodiment, the probe motion may include information received from a motion sensor on probe or sensing the movement of a probe. In some embodiments, the information may be determined from images generated that depict position and/or the motion of a probe. In an embodiment, the user control may include a freeze button to stop RTB 3D volumetric functionality, for example, when the imaging is being performed of an area where 3D volumetric imaging is not required. In an embodiment, the user control input may include information on the depth of the ultrasound imaging being performed. In an embodiment, the user control input may include information on the image size of the ultrasound imaging being performed. In an embodiment, the user control may correspond to a desired display or replay functionality, for example, in order to enable the desired slow motion replay of the ultrasound imaging being performed. In an embodiment, the input is indicative of a type of examination being performed. In an embodiment, the input relates to a clutter or noise level in the images. In an embodiment, the input is related to structures or objects in the ultrasound images. In an embodiment, the input relates to surface rendering of objects in the ultrasound imaging (e.g., to affect the imaging to collect higher or lower resolution data to portray surfaces of objects in the ultrasound images. In an embodiment, the input relates to the intensity projection of the ultrasound transmission beams.

In one innovation, a handheld ultrasound imaging device, comprises an ultrasound imaging array having a plurality of transducers configured to transmit and receive ultrasound waves; and an adaptive retrospective transmit beamforming (RTB) controller for controlling the processing of received ultrasound waves based on at least one input. In some embodiments, the at least one input includes input from a user control on the handheld ultrasound imaging device. In some embodiments, the at least one input includes input from a user control received wirelessly by the handheld ultrasound imaging device. In some embodiments, the at least one input includes a signal indicating to generate a two-dimensional image. In some embodiments, the at least one input includes a signal indicating to generate a three-dimensional image. In some embodiments, the at least one input includes a signal indicating to focus the received ultrasound waves based on a procedure being performed. In some embodiments, the at least one input includes a signal indicating to focus the received ultrasound waves based on an identified object in an ultrasound image generated by the handheld ultrasound imaging device. In some embodiments, the handheld ultrasound imaging device further comprises a thermal sensor, wherein the at least one input includes a signal from the thermal sensor. In some embodiments, the handheld ultrasound imaging device further comprises a housing, where the thermal sensor senses a temperature of the handheld ultrasound imaging device within the housing. In some embodiments, the handheld ultrasound imaging device comprises a battery and an electrical sensor configured to sense a power level of the battery, wherein the at least one input includes a signal from the electrical sensor indicative of the power level of the battery.

In some embodiments of the handheld ultrasound imaging device, the device further comprises a motion sensor configured to sense movement of the handheld ultrasound imaging device, wherein the at least one input includes a signal from the motion sensor indicative of a motion of the handheld ultrasound imaging device. In some embodiments, the motion sensor comprises an accelerometer. In some embodiments, the motion sensor comprises two or more accelerometers. In some embodiments, the motion sensor is configured to sense movement in three dimensions. In some embodiments, the motion sensor is configured to sense at least one of the pitch, the roll, and the yaw of the handheld ultrasound imaging device. In some embodiments, the motion sensor is configured to sense two or more of the pitch, the roll, and the yaw of the handheld ultrasound imaging device. In some embodiments, the motion sensor is configured to sense pitch, roll, and yaw of the handheld ultrasound imaging device. In some embodiments, the RTB controller controls the processing of received ultrasound waves to use a subset of the received ultrasound waves based on the at least one input. In some embodiments, the RTB controller controls the processing of received ultrasound waves to decrease the image frame rate of generating ultrasound images based on the at least one input. In some embodiments, the RTB controller controls the processing of received ultrasound waves to increase the image frame rate of generating ultrasound images based on the at least one input. In some embodiments, the RTB controller controls the processing of received ultrasound waves to increase the resolution of generated ultrasound images based on the at least one input. In some embodiments, the RTB controller controls the processing of received ultrasound waves to decrease the resolution of generated ultrasound images based on the at least one input. In some embodiments of a handheld ultrasound imaging device, the RTB controller is configured to control the processing of received ultrasound waves to change location of focus of generated ultrasound images based on the at least one input.

Another innovation includes a method of generating an ultrasound image with a handheld ultrasound imaging device, the method comprising transmitting a plurality of ultrasound waves into a medium; receiving ultrasound waves propagating through the medium that are generated by the plurality of ultrasound waves transmitted into the medium; receiving at least one input; and processing of the received ultrasound waves by adaptively performing retrospective transmit beamforming (RTB) in the handheld ultrasound imaging device based on the at least one input. In some embodiments, the at least one input includes input from a user control on the handheld ultrasound imaging device. In some embodiments, the at least one input includes input from a user control received wirelessly by the handheld ultrasound imaging device. In some embodiments, the at least one input includes a signal indicating to generate a two-dimensional image. In some embodiments, the at least one input includes a signal indicating to generate a three-dimensional image. In some embodiments, the at least one input includes a signal indicating to focus the received ultrasound waves based on a procedure being performed. In some embodiments, the at least one input includes a signal indicating to focus the received ultrasound waves based on an identified object in an ultrasound image generated by the handheld ultrasound imaging device.

In some embodiments, the method further comprises sensing a temperature of the handheld ultrasound imaging device with a thermal sensor, and receiving a signal from the thermal sensor, wherein the at least one input includes the signal from the thermal sensor. In some embodiments, the method includes receiving information from a thermal sensor that senses a temperature of the handheld ultrasound imaging device. In some embodiments, the method includes receiving information from a thermal sensor that senses a temperature of the handheld ultrasound imaging device within the housing. In some embodiments, the method includes receiving information from a thermal sensor that senses a temperature of a hardware component of handheld ultrasound imaging device. In some embodiments, the method comprises sensing a power level of a battery of the handheld ultrasound device, wherein the at least one input includes a signal from the electrical sensor indicative of the power level of the battery.

In some embodiments, method includes sensing movement of the handheld ultrasound imaging device with a motion sensor, wherein the at least one input includes a signal from the motion sensor indicative of a motion of the handheld ultrasound imaging device. In some embodiments, the motion sensor comprises an accelerometer. In some embodiments, the motion sensor comprises two or more accelerometers. In some embodiments, the motion sensor is configured to sense movement in three dimensions. In some embodiments, the motion sensor is configured to sense at least one of the pitch, the roll, and the yaw of the handheld ultrasound imaging device. In some embodiments, the motion sensor is configured to sense two or more of the pitch, the roll, and the yaw of the handheld ultrasound imaging device. In some embodiments, the motion sensor is configured to sense pitch, roll, and yaw of the handheld ultrasound imaging device. In some embodiments, the method includes adaptively performing retrospective transmit beamforming in the handheld ultrasound imaging device based on the at least one input comprises using a subset of the received ultrasound waves to form an ultrasound image. In some embodiments, the method includes adaptively performing retrospective transmit beamforming in the handheld ultrasound imaging device based on the at least one input comprises decreasing the image frame rate of generating ultrasound images based on the at least one input. In some embodiments, the method includes adaptively performing retrospective transmit beamforming in the handheld ultrasound imaging device based on the at least one input comprises processing of received ultrasound waves to increase the image frame rate of generating ultrasound images based on the at least one input. In some embodiments, the method includes adaptively performing retrospective transmit beamforming in the handheld ultrasound imaging device based on the at least one input comprises processing of received ultrasound waves to increase the resolution of generated ultrasound images based on the at least one input. In some embodiments, the method includes adaptively performing retrospective transmit beamforming in the handheld ultrasound imaging device based on the at least one input comprises processing of received ultrasound waves to decrease the resolution of generated ultrasound images based on the at least one input. In some embodiments, the method includes adaptively performing retrospective transmit beamforming in the handheld ultrasound imaging device based on the at least one input comprises processing of received ultrasound waves to change location of focus of generated ultrasound images based on the at least one input.

DETAILED DESCRIPTION OF CERTAIN EMBODIMENTS

Figure 1:
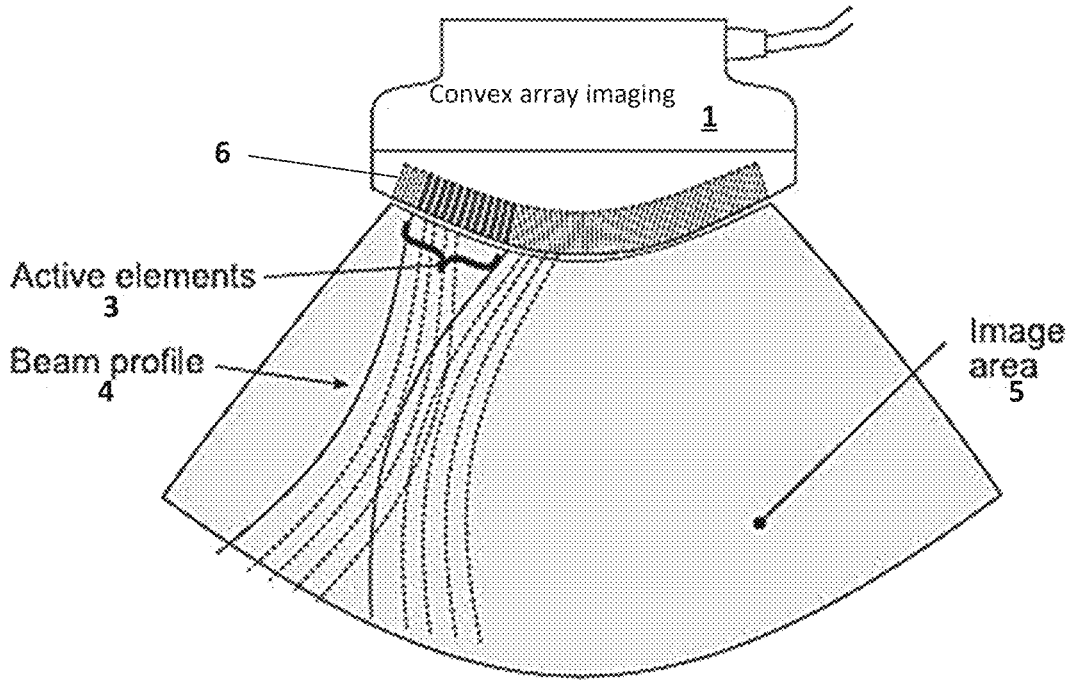
FIG. 1 is a diagram an example of a convex ultrasound array imaging device and illustrating beam profiles from the device.

Ultrasound imaging consists of firing a sequence of ultrasound pulses into the body and then receiving the echoes for image formation or reconstruction. An example is shown in FIG. 1, which illustrates a diagram an embodiment of a convex ultrasound array imaging device 1 imaging an image area 5, which may be a portion of a human, an animal, or another area that is not within a human or animal. FIG. 1 illustrates a representation of beam profiles 4 from the ultrasound device 1. An array of transducers 6 is used on both transmit (Tx) and receive (Rx) ultrasound energy ("ultrasound"). By applying the appropriate delay profiles across the active aperture of the array, Tx pulses form Tx beams as they propagate into the body. Physically, the Tx delay profile is designed such that the ultrasound wave fronts emitted by different transducer elements across the Tx aperture will converge at a desired Tx focus location. The resultant Tx beam generally forms an "hour glass" profile 4 with the narrowest region 5 at, or around, the Tx focus. These focused Tx beams are formed along different scan lines that cover the desired field of view.

As echo signals return to the transducer array 6, dynamic Rx focusing ("Rx beamforming") is performed via a delay-and-sum operation along each scan line. For faster image frame acquisition, multiple Rx beams can be formed around each Tx scan line, a method referred to as multi-line acquisition.

In practice, a more complete description for image reconstruction based on Rx echo data consists of two components: dynamic Rx focusing, and effective Tx focus processing. The latter should not be confused with shaping the physical Tx beam that has already been fired, which is of course not possible. Rather, effective Tx focus processing refers to signal processing that improves the effective Tx focusing relative to the hour-glass shape of a physical Tx beam.

One Tx strategy is to form multiple Tx focal zones per scan line to improve the overall Tx focusing at different ranges. For each such Tx focal zone, a corresponding set of echo signals are captured for Rx focusing. With this strategy, the "effective Tx focus processing" involves stitching together (or accumulating) the Rx focused data for different Tx focal zones to form a composite scan line that is narrower than the hour glass profile of a single Tx beam. However, more Tx focal zones means more Tx firings and more Rx data processing; that is, the price paid is image acquisition frame rate and the amount of compute power required to process the multi-zone echo data. Due to this frame rate vs image resolution tradeoff, the number of Tx focal zones and focus positions can be user-adjustable via the front-panel controls.

Software-driven ultrasound imaging has given rise to an advanced Tx focus processing method known as Retrospective Transmit Beamforming (RTB). RTB makes the "hourglass" profile 4 of a transmit (Tx) beam into effectively a laser-like beam. When coupled with dynamic receive (Rx) focusing, RTB enables two-way ("confocal," "bi-directional") synthetic (or effective) focus everywhere in the image without having to fire multiple Tx beams per scan line. Hence, RTB also represents a breakthrough in clinical workflow because the user no longer needs to manually adjust #Tx zones and their focus positions. In fact, in the past few years, RTB has completely supplanted the multi-Tx-focus firing followed by Tx zone stitching on high-end ultrasound scanners.

How RTB Works:

The raw channel data from all transducer elements are stored for all Tx firings of a single image frame.

RTB combines echo data from different Tx firings to effectively re-focus the unfocused regions of each Tx beam.

For each pixel location, the data from different Tx firings are coherently summed with appropriate time delays.

Additional information on retrospective transmit Beamformation is described in, for example, "Retrospective Transmit Beamformation ACUSON SC2000 Volume Imaging Ultrasound System" (Chuck Bradley, Ph.D., Siemens Medical Solutions USA Inc., 2008), which is incorporated by reference herein.

Challenges of Using RTB

RTB is very computationally intensive because it involves summing echo data from multiple Tx firings for a set of adjacent scan lines. Specifically, the reconstruction of each point or pixel in the image involves:

computing the Tx and Rx propagation times relative to each element of the transducer array, reading the corresponding RF (or equivalent I/Q) echo data from a random access memory unit, summing with the appropriate delay precision (which may require additional interpolation operations)

To support RTB processing at typical ultrasound frame rates, parallel computations for multiple reconstruction locations using GPUs are generally used, but they would consume too much power and generate too much heat for a handheld device. Hence, handheld devices in the current ultrasound market are using ASICs or FPGAs with limited use of RTB, if at all.

Certain Aspects of Adaptive RTB

Figure 2:
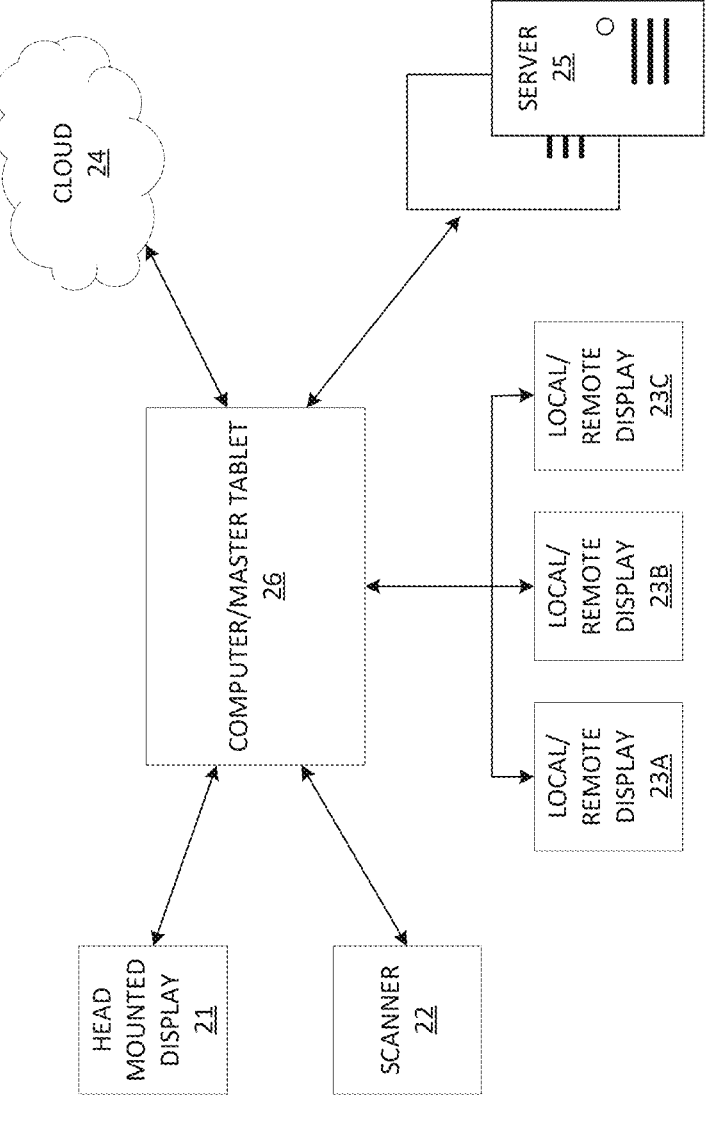
FIG. 2 is a diagram illustrating a healthcare system, and certain functionality and connectivity of a handheld ultrasound imaging device, including communications between the device and a head mounted display, a tablet, local/remote displays, a server, and/or cloud services or "portals."

First, the described handheld ultrasound scanner is much more than just an "acoustic stethoscope," but rather an imaging device which can be incorporated into a much larger healthcare system. In an example, FIG. 2 is a diagram depicting such a healthcare system. In particular, FIG. 2 illustrates various aspects that may be included in such a healthcare system having an adaptive RTB handheld ultrasound imaging device, for example, a handheld ultrasound device (or scanner) 22 configured to perform adaptive RTB, and certain functionality and connectivity of the handheld ultrasound imaging device 22. The connectivity can be via wired and/or wireless connections. The connectivity can include direct or indirect communications between the handheld ultrasound device 22 and a head mounted display 21, a tablet 26, local/remote displays 23*a-c*, one or more servers 25, and/or cloud services 24 or "portals."

Of particular importance to embodiments of the present invention are:

The image display may include a local or remote 2D screen, or a head mounted display (HMD).

Images can be stored in the cloud not just for archival purpose, but also for AI/ML applications that have been configured and trained to use one or more of the captured ultrasound images to identify objects or other features in the ultrasound images.

Given the broad end-to-end healthcare delivery vision, embodiments of this invention are configured such that for a handheld ultrasound device, maximum image quality as obtained by RTB (coupled with dynamic Rx focusing) is NOT needed in many of the use contexts. Instead, the image quality as obtained by RTB can changed based on one or more inputs. For example, in various embodiments changing the image quality of a handheld ultrasound device this can be done dynamically based on one or more of a user input, a determined information, or a sensed value.

Figure 3:
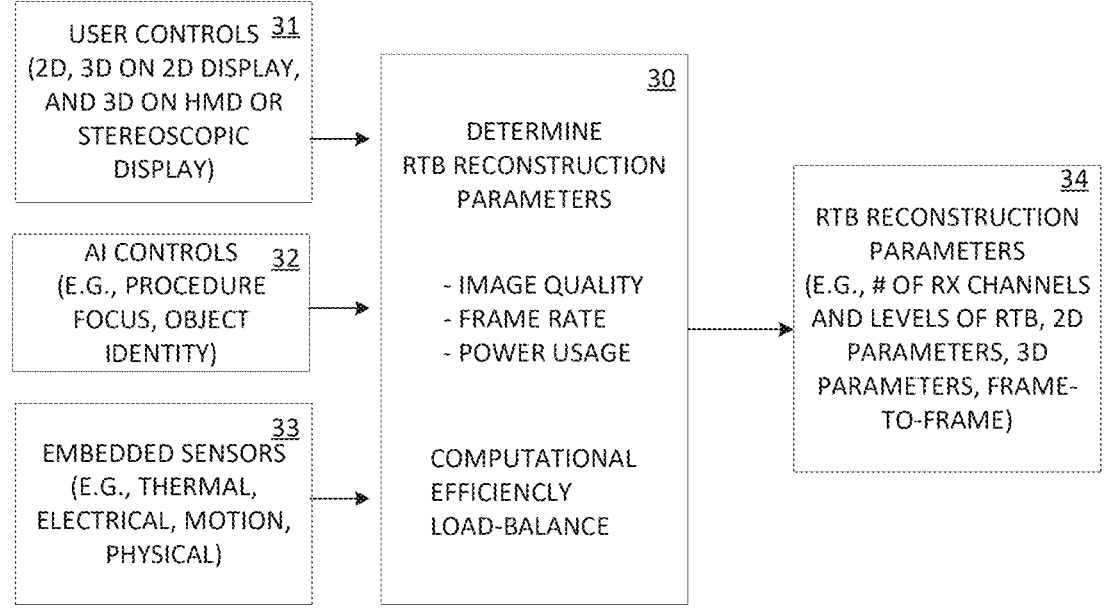
FIG. 3 is a diagram illustrating the an embodiment of an adaptive image reconstructions model that optimizes the balance between image quality, frame rate (processing speed) and power usage.

FIG. 3 is a diagram illustrating the an embodiment of an adaptive image reconstruction process 30 that optimizes the balance between image quality, frame rate (processing speed) and power usage (or power burn). In some embodiments, a handheld ultrasound imaging device can be configured to perform RTB processing that is influenced or changed by an input or parameter. For example, an input that changes control parameters for the RTB imaging based on one or more of a user input, an automatic or artificial intelligence (AI) input, and/or an sensor input (for example, an embedded sensor input), as described further below.

In this example, inputs to an adaptive RTB reconstruction process 30 can include information from three sources 31, 32, 33 and result in parameters 34 to control the RTB processing:

(i) User-controls 31 in 2D imaging mode, 3D on 2D display, and 3D on a head-mounted display (HMD) or a stereoscopic 3D display. In other words, the user can determine the imaging mode or the desired display mode and provide a user input to the process (e.g., model) and the process uses the input to determine and provide RTB reconstruction parameters.

(ii) AI controls 32 to provide an input for several aspects. For example, in one aspect AI controls can be used to increase or decrease focus or resolution based on a particular process being performed. For example, a process may require a high or the highest resolution possible (e.g., tracking a needle tip inside a human or animal), or a process that may be able to be performed using a lower resolution (e.g., initial scan of an imaging area to determine areas of interest for further investigation). In another aspect, AI controls to increase or decrease resolution based on the size or type of object being identified in 2D or 3D images (e.g., large or small objects). In another aspect, AI controls based on object identification in 2D/3D ultrasound images collected from the ultrasound device, or images collected from another imaging device.

Figure 4:
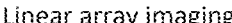
FIG. 4 is a diagram an example of a liner ultrasound array imaging device and illustrating beam profiles from the device.
Figure 4:
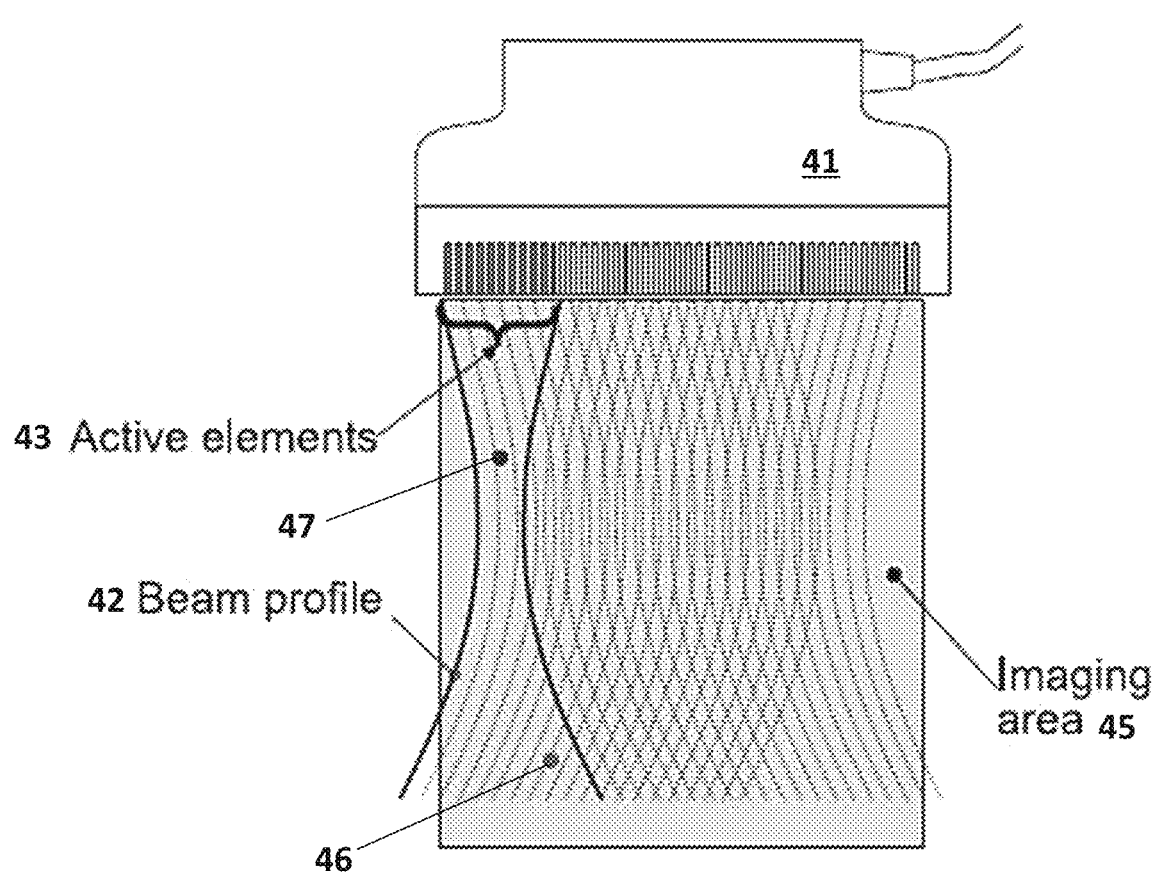

(iii) "Embedded" sensors 33 including thermal (e.g., device body temperature), electrical (e.g., battery charge) and physical (e.g., device motion). The embedded sensors can be one or more embedded sensors (that is, "embedded sensors" is used herein to refer to either a single sensor or a plurality of sensors). In an example, the embedded sensors 33 can include a thermal sensor on the inside or outside of the housing of an ultrasound device, or on a particular component of the ultrasound device (e.g., on or adjacent to a CPU or GPU of an ultrasound device). For example, as illustrated in FIG. 4, in one embodiment, the embedded sensors 33 can include a temperature sensor 52 that senses the temperature of the transducer array 51. In another example, as illustrated in FIG. 4, in one embodiment the embedded sensors 33 can include a temperature sensor 60 that senses the temperature of the GPU/CPU 62. In another example, the embedded sensor can be an electrical sensor that monitors an electrical characteristic of the handheld ultrasound device. For example, a current sensor that senses current being used by the ultrasound device. In another example, a sensor that senses the amount of life (power) left in a power source (e.g., battery or capacitor) of the ultrasound device. For example, as illustrated in FIG. 4, the embedded sensors 33 can include a sensor 67 that senses the power or charge remaining in a battery 57, or the amount of power being provided by a power supply 54. In another example, the embedded sensor senses a movement of the ultrasound device (e.g., one or more accelerometers). For example, as illustrated in FIG. 4, the embedded sensors can include motion sensor 58 that senses movement (or a motion) of the handheld device. In another example, the embedded sensor is a sensor that senses any physical characteristic of the handheld ultrasound device. The embedded sensors 33 are in communication with the RTB control processing 30 functionality such that the embedded sensors can provide information to the RTB control processing 30 to be used to determine parameters of the RTB functionality.

As shown on the right side of FIG. 3, embodiments of this invention implement a "scalable RTB" process controlled by information (e.g., parameters) output from the RTB control processing 30. In some embodiments, the RTB control processing can be implemented as an optimization model that optimizes one or more of image quality, frame rate, and power usage based on inputs. The RTB control processing can be implemented in software, for example, on a computer hardware central processing unit (CPU) or a GPU configured to execute computer instructions stored on a non-transitory computer storage medium that is in communication with the CPU or GPU. In some embodiments, the RTB control processing can be implemented in hardware. The information (inputs) received by the RTB control processing information can control the RTB processing to:

(1) Use a subset of the Rx channel data. This will reduce computational burden (and power burn) just for dynamic Rx focusing alone independent of RTB. Dynamic Rx focusing is achieved by the standard delay-and-sum operation. Since the number of Rx channels effectively defines the Rx aperture, which in turn affects the lateral Rx focus and resolution. Note: it is somewhat a matter of semantics whether Rx focusing is considered an integral part of RTB, or an image recon component separate from RTB.

(2) Form a coherent sum of Rx data from a subset of the Tx firings. The maximum RTB effect is achieved when all Tx beams that contribute to a pixel location are combined. In reference to FIG. 4, in general, the number of hour-glass-shaped Tx beams that overlap at a specific pixel location is range dependent; it is higher for pixels that are farther away (the "fat" or unfocused regions of the hour glass profile) from the Tx focus. For example, the dot 46 in FIG. 4 (in the unfocused region of the hourglass profile) has contributions from eight Tx beams, whereas the dot 47 near the focal region has contributions from only two Tx beams. By implementing a process that changes RTB parameters (e.g., user controls, AI controls, and/or sensors) RTB can be implemented as a "scalable" algorithm in the sense that even combining data from a limited number of transmits (relative to the maximum number at a given range) can still produce noticeable image quality improvement(s). For a given processor (e.g., a GPU), combining more Tx firings results in more computing (delay calculation, memory access, summing operations), which results in lower image frame rate, which results in higher power burn (and device heating). In some embodiments, specific schemes for reduced coherent summation especially in the unfocused regions of the Tx beam, can include (i) summing only the N closest Tx firings, N<Nmax, where Nmax is the maximum #Tx that contribute to the given pixel location; and/or (ii) skipping, as an example, every other Tx firings for a reduction factor of 2×.

FIG. 4 is a diagram an example of a liner ultrasound array imaging device 41 having illustrating beam profiles from the device 41. As shown in FIG. 4, ultrasound energy is transmitted by active elements 43 into an imaging area 45, as indicated by the beam profiles 42. From a physics viewpoint, RTB works by increasing the angular diversity of the component plane waves that constitute the overall Tx wavefront at a given range. A coherent summation of Rx data from Tx firings that are farther apart will tend to yield greater angular diversity which should result in a narrower effective Tx main lobe (lateral spatial resolution.) On the other hand, the beam sidelobes from adjacent Tx firings are very sensitive to the exact Tx beam orientation. So combining Rx data from adjacent Tx firings will tend to cause Tx beam sidelobe cancellation thereby improving the contrast resolution. These considerations will be taken into account in choosing the desired scheme for reducing the RTB coherent summation.

While the above two basic controls can be used in combination to "scale back" RTB in every 2D/3D reconstructed frame, they can also be applied over successive image frames. For example, the RTB recon parameters can be adjusted periodically in the temporal sequence of image frames (e.g., every other frame) to achieve a finer or additional reduction in average computational burden/power burn/heating.

Figure 5:
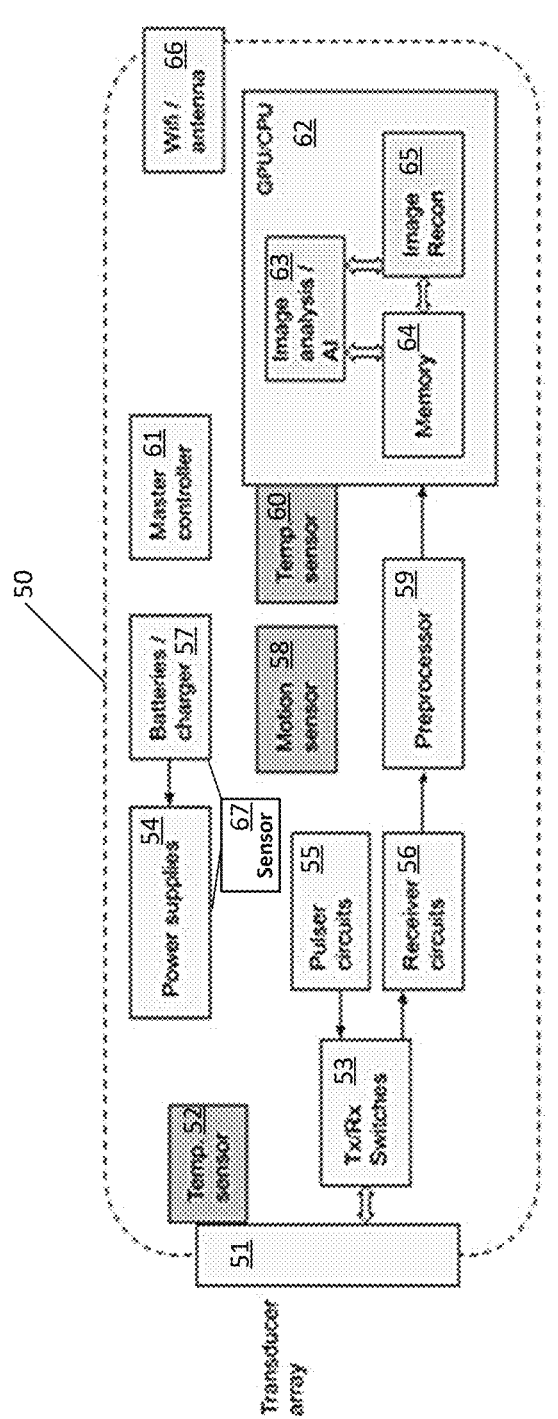
FIG. 5 is a schematic of an example of a handheld ultrasound device configured to perform adaptive RTB.

FIG. 5 is a schematic of an example of a handheld ultrasound device 50 configured to perform adaptive RTB processing ("adaptive RTB"), according to some embodiments. The handheld ultrasound device 50 includes a transducer array 51 in communication with, or couple to, transmit and receive switches 53. In some embodiments, the temperature sensor 52 is positioned (and/or configured) such that it can sense the temperature of the transducer array 51. Pulser circuits 55 and receiver circuits 56 are in communication with the transmit receive switches 53, such that the pulser circuits 55 can provide signals to the transmit switches 53, which are then communicated the transducer array 51. The receiver circuits 56 receive signals from the transducer array 51 communicate the signals to the preprocessor 59 which then communicates signals to the GPU/CPU 62 for processing (e.g., determining an ultrasound image(s)). As illustrated in FIG. 5, the GPU/CPU 62 may include computer memory 64 which can include a nontransitory computer storage medium, image analysis and AI functionality 63, and image reconstruction functionality 65. In various embodiments, the image analysis and AI functionality 63 in the image reconstruction functionality 65 are implemented by computer executable instructions that are stored in memory 64 and executed by the GPU/CPU 62. The handheld ultrasound device 50 can also include one or more temperature sensors 60 that are configured to sense the temperature of the GPU/CPU 62 upright provide temperature information to the GPU/CPU 62 for use in performing adaptive RTB. The handheld ultrasound device 50 can also include one or more motion sensors 58 that are configured to sense movement of the handheld ultrasound device to provide information related to the movement to the GPU/CPU 62 for use in performing adaptive are to be. For example, the motion sensor 58 can provide information indicating that the handheld ultrasound device 50 is not in motion, and therefore not be used, and such information can be used to minimize are to be processing it is being performed at the moment. Because of the power RTB processing uses, toggling RTB between a low or no power usage state (e.g., when the handheld ultrasound device is motionless) to a higher power usage state (e.g., when the handheld ultrasound device is being used), even for short period of time, can result in large power savings. In some embodiments, the adaptive RTB processing can be performed in the GPU/CPU 62. In some embodiments, the adaptive RTB processing can be performed by a separate controller in the handheld ultrasound device 50, e.g. a master controller 61. The handheld ultrasound device 50 also includes an antenna in other communication circuitry 66 which it uses to communicate collected image information to another computer device, and through which the handheld ultrasound device 50 can also receive control information including user input information. In various embodiments, one or more of the illustrated modules (or functionality) may not be included in a handheld ultrasound device. Also, various embodiments of an adaptive RTB handheld ultrasound device may include one or more additional modules (or functionality).

In the system diagram illustrated in FIG. 5, the dashed line encompasses the entire handheld device 50 in which the transducer array 51 may be 1D or a 2D matrix array 51. Both the power supplies 54 and master controller 61 communicate with all of the ultrasound device 50 subsystems respectively. The pulser circuits 55 generate voltage signals to actuate the transducer elements with appropriate Tx delays for Tx beamforming. The receiver circuits 56 typically include RF amplifiers, analog filters and ADC. The pre-processor performs basic or sequential digital data processing (e.g. time-gain-compensation, RF-to-IQ conversion) that can be efficiently implemented in hardware or firmware in order to minimize cost and power consumption. Embedded sensors (orange colored blocks) may include miniaturized motion sensors 58 (e.g. inertial motion unit and/or accelerometer similar to those used in a smart Phone) and temperature sensors 52, 60. The examples shown includes a temperature sensor 52 near the transducer array 51, and a temperature sensor 60 near the GPU/CPU 62. A key enabler for this invention is the memory unit 64 (e.g. Cache, RAM) within the GPU/CPU 62 that has sufficient capacity to store an entire image frame's worth of a 3D data set (Tx firing× transducer channel×range). The image analysis/AI module 63 and the Image Reconstruction module 65 represent software modules within the GPU/CPU. In general, image recon can be implemented in either an acoustic scan line (R-theta) domain, or an X-Y coordinate domain.

Various embodiments of the present disclosure may be a system, a method, and/or a computer program product at any possible technical detail level of integration. The computer program product may include a computer readable storage medium (or mediums), for example, as illustrated in FIG. 5, having computer readable program instructions thereon for causing a processor to carry out aspects of the present disclosure. For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective ultrasound imaging devices, that include computing/processing devices, from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, IOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
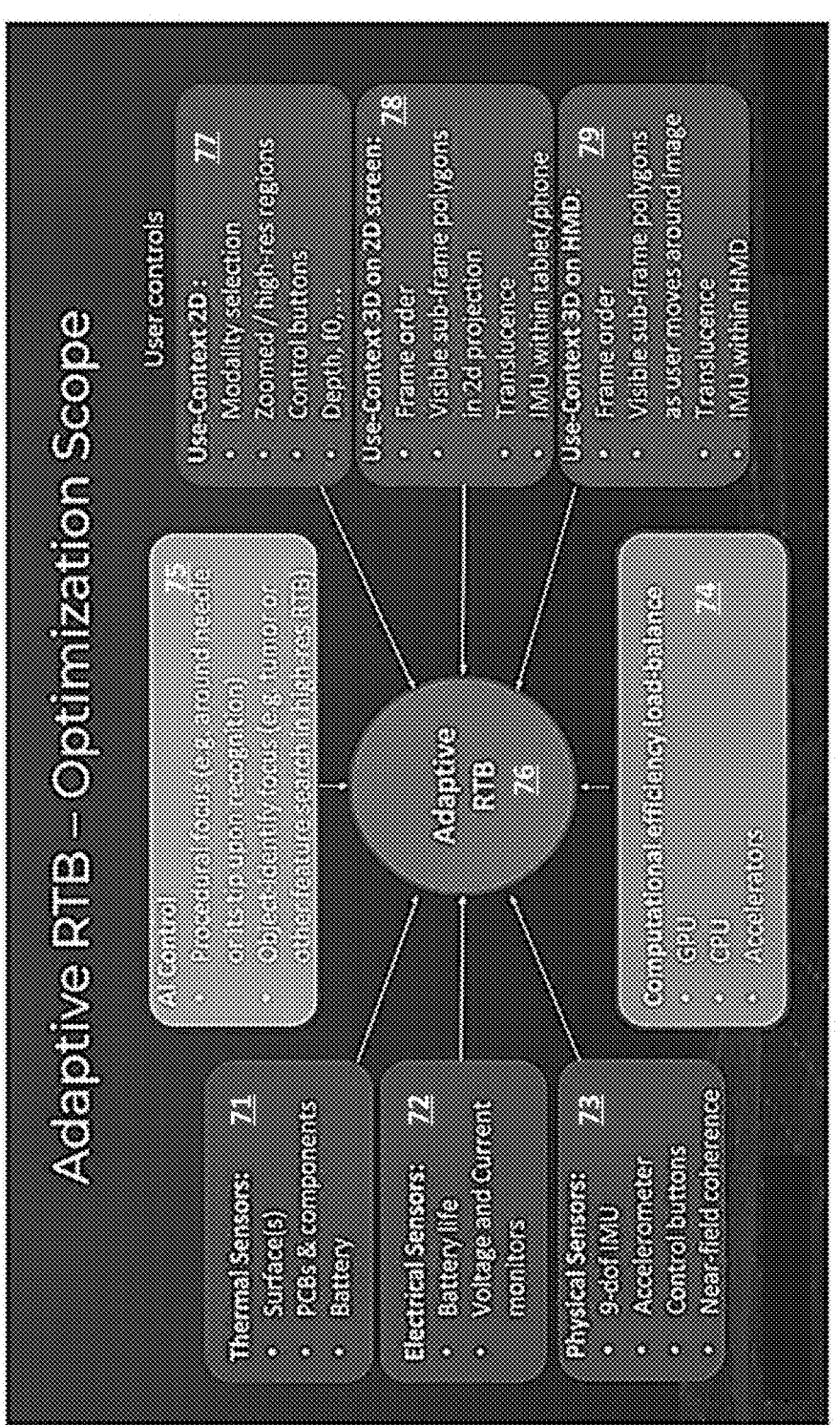
FIG. 6 is a diagram illustrating adaptive RTB functionality and components that can be included in various embodiments a handheld ultrasound device.

In an example, embodiments of the invention are enabled once an entire image frame's worth of Rx echo data is stored in the memory unit of the GPU (or CPU). This represents the linchpin between raw channel data acquisition and adaptive RTB recon-without having the entire Rx channel data set available, these embodiments may not work well in many/most of the use contexts. FIG. 6 is a diagram illustrating adaptive RTB functionality and components that can be included in various embodiments a handheld ultrasound device, for example, the handheld ultrasound device 50 illustrated in FIG. 4. FIG. 6 illustrates, for example, a more detailed view of the scope of the adaptive RTB invention.

As illustrated in FIG. 6, components of an adaptive RTB system can include one or more thermal sensors 71. In various embodiments, the thermal sensor 71 can sense the temperature of a portion of the handheld ultrasound device (e.g., a component), for example, the temperature of the surface of a component, a printed circuit board, or battery. The components of an adaptive are to be system can also include one or more electrical sensors 72. In various embodiments, such electrical sensors 72 can sense the battery life remaining in a battery of the handheld ultrasound device. In various embodiments, the electrical sensors 72 can monitor and sense a voltage or a current in a handheld ultrasound device. In various embodiments, the handheld ultrasound device can include one or more physical sensors 73. For example, a physical sensor may include a 9 degree of freedom inertial measurement unit (IMU) would senses 3 degrees each of acceleration, magnetic orientation, and angular velocity. The adaptive RTB system can also include AI control 75 that determines RTB parameters to use based on procedural focus (e.g., focus needed to execute a certain procedure). The adaptive RTB system can also include AI control 75 that determines RTB parameters to use based on object identity focus (e.g., focus needed to identify a certain type of object, tumor, or other feature in the ultrasound image). User controls can also be input to the adaptive RTB process 76. For example, user controls that indicate a use-context for 2D 77 (e.g., on a 2D display). Examples of user controls include modality selection, zoom or indications of high-resolution regions needed to be imaged, control buttons that are available, depth of field, etc. user controls can also indicate a use-context of 3D on a 2D screen. For example, user controls can indicate frame order, visible subframe polygons in a 2D projection, a translucence value, and IMU within a tablet or phone being used to view results. User controls can also be input to the adaptive RTB process that relate to a use-context of 3D for a head mounted display. For example, frame order, visible subframe polygons to display as a user moves around the image, translucence, and input from an IMU within the head mounted display. A computer hardware processor may receive these inputs and perform adaptive RTB 76, determining parameters to control the RTB ultrasound imaging being performed.

Adaptive RTB consists of a pre-determined RTB optimization model that defines the target frame rate and image format parameters for different imaging scenarios or use contexts. Adaptive RTB will also include a "RTB processing model" that can reliably estimate the computational efficiency or load-balance for the GPU/CPU/accelerators in the system. The RTB processing model prescribes the RTB parameter values that provide the optimal image quality and computational efficiency, which keeps the power consumption of the embedded processor at the maximum allowable limit.

During the device operation, the inputs to the RTB optimization model fall into three categories as described in the following subsections.

I) User Controls

The following table includes a list of examples of user-selected operating modes and the corresponding image recon parameter adjustments.

| User-selected Operating Mode | Specific examples & corresponding image recon parameter adaptation |
| --- | --- |
| Exam type (presets) | Shallow and non-moving organ: limited range samples, go full-blown RTB and maintain high frame rate |
| Image freeze | Go full-blown RTB as IQ is top priority for image storage and for anatomical measurements, even if it takes a couple seconds per frame |
| Depth/Image size (including display zoom) | Smaller, shallower images => frame rate not a concern, go for higher level of RTB |
| Slow motion replay | Frame rate is low by choice in order to examine details-go full-blown RTB (e.g., at the highest level of RTB possible for the device) |
| Color flow ON | B-mode is used mainly as a background anatomical image-minimal RTB |
| 3D recon for a 2D/ 3D screen display | Higher level of RTB (resolution) for front-facing pixels in a surface rendered 3D volume; consider different RTB levels for inner and outer slices associated with the inner and outer rows respectively of a matrix array |
| 3D recon for a HMD display | Optimize RTB taking into account the frame order, visible sub-frame polygons when user moves around image, translucence and IMD data within the HMD |

II) AI Controls

AI computations are implemented in the "image analysis" block in the system block diagram. AI includes machine learning approaches where a neural network (e.g. CNN) is trained on previously collected image examples to recognize specific signatures/features in the images. This means that there will be a feedback loop between the image recon and image analysis software modules running on the GPU.

A) Procedure focus: tracking the tip of a needle in an interventional procedure.

B) Image Analysis: this may encompass different types of image classification and recommended RTB recon adjustments. Exemplary types include, i) Organ motion due to breathing or heart beats Organ motion can be detected by analyzing image changes from frame to frame. As a specific embodiment, a simple algorithm such as sum of absolute differences (SAD) can be applied over the successive frames in the image analysis block, to check if the SAD exceeds a certain threshold value.

ii) Clutter noise level

High clutter noise in areas of interest may warrant a higher level of RTB in attempt to obtain better image clarity.

iii) Presence or absence of image features/artifacts. Examples include

B-lines in a lung scan

A breast lesion

A deep vein thrombus

III) Embedded Sensors

A) Thermal: Built-in temperature sensors indicate that the probe and/or device body surface getting hot=>reduce RTB processing and frame rate.

B) Electrical: Battery charge remaining is low, perhaps depending on exam type also, reduce RTB processing to conserve power.

C) Physical: In a typical ultrasound exam protocol, the user starts by moving the probe over the body surface (i.e. survey mode). Device motion can be detected by the embedded motion sensor(s) directly. If the probe motion is high relative to a predetermined threshold, the image will generally tend to be blurry, such that the need to maximize frame rate outweighs image resolution. In this scenario, the image recon quality can be reduced in order to maximize frame rate.

When a target anatomical region is found, the patient may be asked to hold breath for a few seconds. Clearly, the frame rate can be reduced in order to increase image resolution for optimal visual inspection of the target region.

Figure 7:
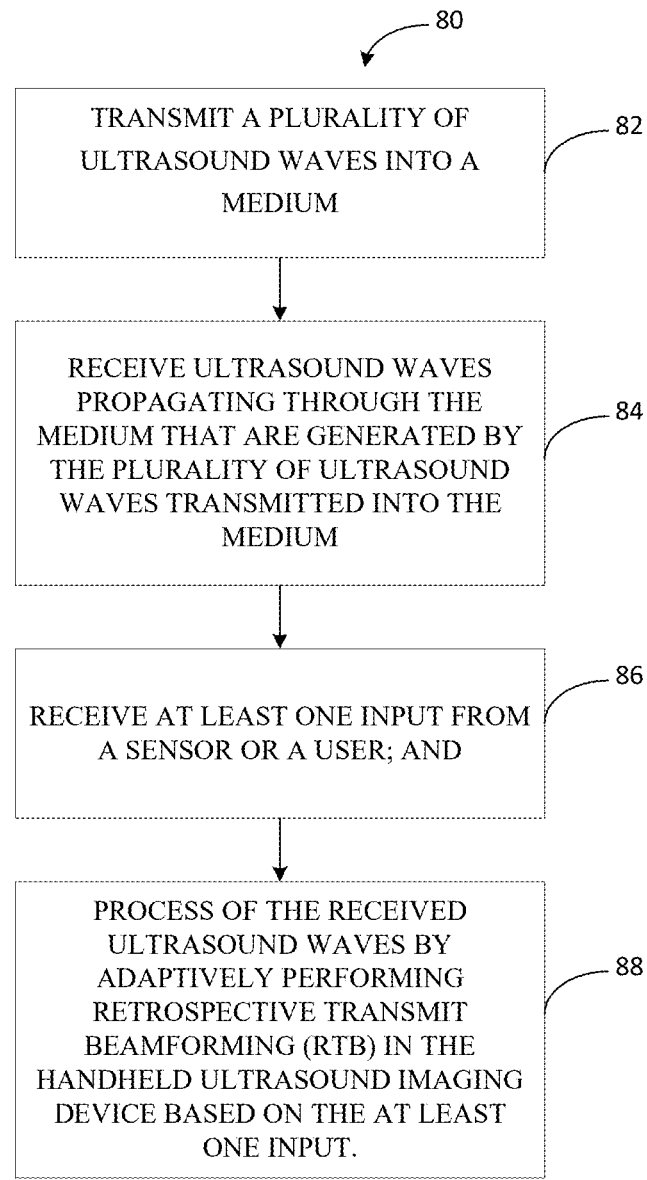
FIG. 7 is a flowchart that illustrates an example of a process for generating an ultrasound image with a handheld ultrasound imaging device using adaptive retrospective transmit beamforming (RTB).

FIG. 7 is a flowchart that illustrates an example of a process 80 for generating an ultrasound image with a handheld ultrasound imaging device using adaptive retrospective transmit beamforming (RTB). For example, the handheld ultrasound imaging device 50 illustrated in FIG. 5. At block 82 the process 80, transmits a plurality of ultrasound waves into a medium. In an example, the plurality of ultrasound waves are provided into a medium by a transducer array, e.g., transducer array 51 (FIG. 5). At block 84, the process 80 receives ultrasound waves propagating through the medium that are generated by the plurality of ultrasound waves transmitted into the medium. In an example, the plurality of ultrasound waves are received by the transducer array 51 (FIG. 5). At block 86, the process 80 receives at least one input. In various examples, the input can be from one or more of a user input from a user control (e.g., a button or a input on a display screen), a determined input where software or hardware executing instructions determines the input (e.g., based on a type of a procedure being performed), and/or one or more embedded sensors (e.g., a thermal sensor, an electrical sensor, a motion sensor, or a sensor sensing a physical characteristic). Finally, at block 88 the process 80 processes received ultrasound waves by adaptively performing retrospective transmit beamforming (RTB) in the handheld ultrasound imaging device based on the at least one input. For example, to increase or decrease the resolution of the ultrasound images being generated.

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A handheld ultrasound imaging device, comprising:
an ultrasound imaging array having a plurality of transducers configured to transmit and receive ultrasound waves;
a motion sensor configured to sense movement of the handheld ultrasound imaging device; and
an adaptive retrospective transmit beamforming (RTB) controller for controlling processing of received ultrasound waves based on at least one input, the RTB controller configured to adjust a target frame rate and at least one image format parameter to a desired value of a range of values based on the at least one input,
wherein the at least one input includes a signal from the motion sensor indicative of motion of the handheld ultrasound imaging device,
wherein the RTB controller is configured to adaptively select a RTB profile among a plurality of RTB profiles in order to optimize a balance between image quality, frame rate, and power usage based on the motion of the handheld ultrasound imaging device, and
wherein each RTB profile comprises a set of RTB processing parameters including the target frame rate and the at least one image format parameter.

2. The handheld ultrasound imaging device of claim 1, wherein the at least one input further comprises input from a user control.

3. The handheld ultrasound imaging device of claim 2, wherein the user control is received wirelessly by the handheld ultrasound imaging device.

4. The handheld ultrasound imaging device of claim 1, wherein the at least one input further comprises a signal indicating to generate a two-dimensional image.

5. The handheld ultrasound imaging device of claim 1, wherein the at least one input further comprises a signal indicating to generate a three-dimensional image.

6. The handheld ultrasound imaging device of claim 1, wherein the at least one input further comprises a signal indicating to focus the received ultrasound waves based on a procedure being performed.

7. The handheld ultrasound imaging device of claim 1, wherein the at least one input further comprises a signal indicating to focus the received ultrasound waves based on an identified object in an ultrasound image generated by the handheld ultrasound imaging device.

8. The handheld ultrasound imaging device of claim 1, further comprising a thermal sensor, wherein the at least one input further comprises a signal from the thermal sensor.

9. The handheld ultrasound imaging device of claim 8, further comprising a housing, and wherein the thermal sensor senses a temperature of the handheld ultrasound imaging device within the housing.

10. The handheld ultrasound imaging device of claim 1, further comprising a battery and an electrical sensor configured to sense a power level of the battery, wherein the at least one input further comprises a signal from the electrical sensor indicative of the power level of the battery.

11. The handheld ultrasound imaging device of claim 1, wherein the motion sensor comprises an accelerometer.

12. The handheld ultrasound imaging device of claim 1, wherein the motion sensor comprises two or more accelerometers.

13. The handheld ultrasound imaging device of claim 1, wherein the motion sensor is configured to sense movement in three dimensions.

14. The handheld ultrasound imaging device of claim 1, wherein the motion sensor is configured to sense at least one of the pitch, the roll, and the yaw of the handheld ultrasound imaging device.

15. A method of generating an ultrasound image with a handheld ultrasound imaging device using adaptive retrospective transmit beamforming (RTB), comprising:
transmitting a plurality of ultrasound waves into a medium;
receiving ultrasound waves propagating through the medium that are generated by the plurality of ultrasound waves transmitted into the medium;
receiving at least one input;
processing of the received ultrasound waves by adaptively performing retrospective transmit beamforming (RTB) in the handheld ultrasound imaging device based on the at least one input; and
adjusting, using an adaptive RTB controller, a target frame rate and at least one image format parameter to a desired value of a range of values based on the at least one input to adaptively select a RTB profile among a plurality of RTB profiles in order to optimize a balance between image quality, frame rate, and power usage based on the at least one input, wherein the at least one input includes a signal from a motion sensor indicative of a motion of the handheld ultrasound imaging device, and wherein each RTB profile comprises a set of RTB processing parameters including the target frame rate and the at least one image format parameter.

16. The method of claim 15, wherein the at least one input further comprises input from a user control.

17. The method of claim 16, wherein the user control is received wirelessly by the handheld ultrasound imaging device.

18. The method of claim 15, wherein the at least one input further comprises a signal indicating to generate a two-dimensional image.

19. The method of claim 15, wherein the at least one input further comprises a signal indicating to generate a three-dimensional image.

*  *  *  *  *